June 26, 1923.

C. A. CLEGHORN 1,460,053

BALLOON FABRIC AND METHOD OF MAKING SAME

Filed Nov. 26, 1919

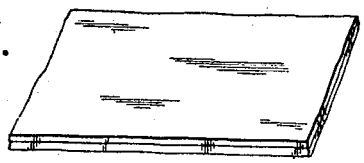

Fig.1.

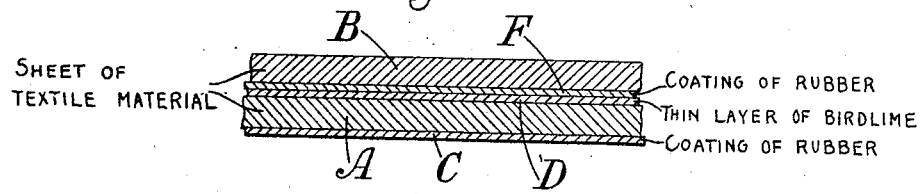

Fig.2.

Sheet of Textile Material — B, F, A, C, D — Coating of Rubber / Thin Layer of Birdlime / Coating of Rubber

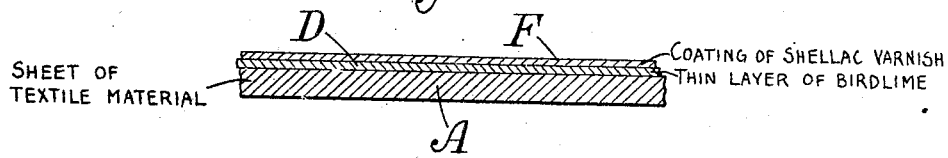

Fig.3.

Sheet of Textile Material — D, F, A — Coating of Shellac Varnish / Thin Layer of Birdlime

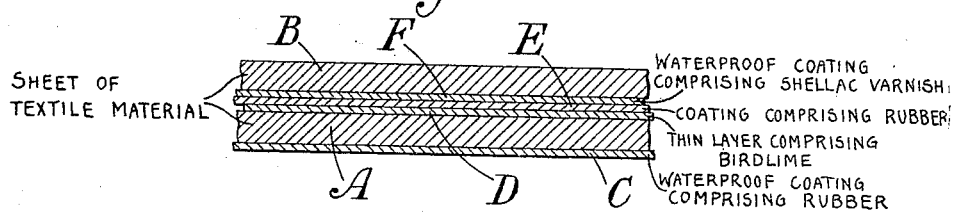

Fig.4.

Sheet of Textile Material — B, F, E, A, D, C — Waterproof Coating Comprising Shellac Varnish / Coating Comprising Rubber / Thin Layer Comprising Birdlime / Waterproof Coating Comprising Rubber Inventor
Charles Argus Cleghorn,
by Byrnes, Stebbins, Burgess & Parmelee,
his attys.

Patented June 26, 1923.

1,460,053

UNITED STATES PATENT OFFICE.

CHARLES ANGUS CLEGHORN, OF WOBURN SANDS, ENGLAND.

BALLOON FABRIC AND METHOD OF MAKING SAME.

Application filed November 26, 1919. Serial No. 340,942.

*To all whom it may concern:*

Be it known that I, CHARLES ANGUS CLEGHORN, subject of the King of England, residing at Woburn Sands, in the county of Bedford, England, have invented certain new and useful Improvements in Balloon Fabrics and Methods of Making Same, of which the following is a specification.

This invention is for improvements in or relating to balloon-fabrics and the like, and has for its object to provide a fabric which shall be impervious to gases, particularly those which more readily pass through materials than does air, of which hydrogen is an example. As is well-known a considerable amount of leakage takes place in balloons through the actual fabric of the balloon, even when this is rubber-coated.

According to one feature of the invention, a balloon-fabric is composed of two sheets of thin textile material placed face to face, whereof one sheet is of absorbent material and has on its inner face a thin layer of birdlime and the other sheet is so prepared that the birdlime does not so readily adhere to it as to the first sheet.

Another feature of the invention consists in a method of manufacturing balloon or like fabric which consists in:—

(a) coating a sheet of material (for example textile material) with a thin layer of birdlime, (b) expelling moisture from the coating of birdlime by heating to a moderate heat (for example 180° F.), and (c) applying to the coating of birdlime thus dried an adhesive waterproof coating.

This adhesive waterproof coating may take the form of shellac varnish or rubber solution. If the latter is used it may, after drying, either be vulcanized or coated with shellac varnish, or used (i. e. before it dries) as an adhesive to secure in place another sheet of material (for example textile material).

The birdlime employed is such as is commonly known as "Turkish birdlime" or some similar substance prepared from the fruits of the trees of the Cordiaceæ known botanically as *Cordia myxa* and *Cordia latifolia*, and will be referred to throughout this specification merely as "birdlime." By a "thin layer" is meant a layer such as cannot be obtained by the crude birdlime. This substance is very tenacious and cannot be spread in a thin enough layer to make it practical for use in a balloon-fabric, and therefore it must be thinned by some means such as is described in the prior patent specification Serial No. 268,405. According to this earlier specification, the birdlime is thinned by heating it to about 180° F. and mixing gradually therewith alcohol. Prior to adding the alcohol, a solution of borax, or hot water alone, may be mixed with the birdlime to loosen the material so that it can be easily stirred as the alcohol is introduced.

Other materials may be incorporated in the "Turkish birdlime" according to requirements, for example diatomaceous earth or shellac, or both, or dextrine, may be added to the birdlime thinned according to the above process. These act as filling agents and tend to lessen the hygroscopic action of the birdlime.

The birdlime thus thinned can be spread in a layer of, say, one-sixty-fourth of an inch thick or less over the material to be coated, and thus a practical article is produced whereas heretofore it has only been proposed to use this birdlime in the crude form as a thick layer in a pneumatic tyre to render the tyre self-sealing.

In the drawing, Figure 1 is a plan view of a piece of one form of balloon-fabric made according to the invention;

Figure 2 is an enlarged sectional view thereof showing the different layers, some of which are of an exaggerated thickness; and Figures 3 and 4 are views similar to Figure 2, but showing other forms of fabric embodying the invention.

According to one method of carrying out this invention, the balloon-fabric (Figures 1 and 2) is built up of two sheets A, B of thin textile material placed face-to-face, one or both sheets being of absorbent material. One of the sheets has applied to its outer face a coating C of rubber or rubber-like composition such as one of the oil substitutes for rubber, and on the inner face a thin layer D of birdlime. The other sheet has a coating of E rubber or rubber-like composition on its inner face, that is, the face next to the birdlime, and the outer face which may constitute the interior face of the balloon wall may be left bare.

The reason for this arrangement is that the Turkish birdlime never properly dries and therefore must be covered with some facing, and on the other hand, it does not cause the sheets to adhere together sufficiently to ensure that they will not part in use. If the birdlime adhered equally to both sheets and they were parted, neither sheet might be fully protected with birdlime and therefore gas might escape, but by applying the birdlime to an absorbent face of one sheet and having a non-absorbent face of the other sheet, such as the rubbered face, against it, the birdlime will, if any parting of the sheets takes place, always adhere bodily to the sheet having the absorbent face and thus that sheet will always be impervious to gas.

An inherent quality of the birdlime is that it extracts moisture from its surroundings. As a consequence of this it is difficult sometimes to get it to adhere continuously to a large area of material, particularly a material with a non-absorbent surface such as a rubbered surface. Therefore in building up a fabric as described above, which consists of two sheets of material with an intervening layer of birdlime, the adjacent faces of which sheets of material are in the one case absorbent and in the other case non-absorbent it sometimes happens that the birdlime does not adhere very well to the sheet whereof the non-absorbent face is in contact with the birdlime. If, however, after the layer of birdlime has been applied to the absorbent face of one sheet, it is dried under a moderate heat say 180° F. it is possible to apply an adhesive substance such as rubber solution to this dried layer and use this adhesive substance to secure the other sheet of material in position. It is thought that the birdlime permeates the absorbent face of the one sheet as well as coats it. When it has been dried as mentioned above and the adhesive substance applied it is thought that the latter probably combines to a certain extent with portions of the dried birdlime as well as adhering to the slight irregularities in the absorbent face. The resultant product in this case will be two sheets of material adhering together and enclosing a layer of birdlime. In the course of time the birdlime will absorb a certain amount of moisture from its surroundings and thus become operative to render the fabric impervious to gases such as hydrogen, helium or noxious gases which would penetrate ordinary rubber. This moisture is probably absorbed through the edges of the fabric and when the fabric is finished it is advisable to allow it to lie in a damp situation in order that it may thus absorb moisture. It will then become flexible and ready for use.

It is not essential that the fabric should consist of two sheets of textile or similar material enclosing a layer of birdlime. If, as shown in Figure 3, a single sheet A of such material is coated with a layer D of birdlime, and dried as aforesaid, an adhesive waterproof coating F of a different nature may be applied with good results. For example, the dried layer of birdlime may be coated with shellac varnish which after it has itself dried will serve as a waterproof coating. Or, as shown in Figure 4 a layer E of rubber solution may be applied which after drying may be vulcanized or itself coated with shellac varnish, as shown at F. Or such a layer of rubber solution could be employed to hold in place another sheet of textile or other material as aforesaid.

It is to be understood that the present invention provides both a new product and a new process or method of manufacture. Also that the invention is not limited to the precise details hereinbefore enumerated. For example any suitable form of adhesive substance may be employed for this instead of shellac varnish and rubber solution. It is necessary that either the adhesive coating itself or some other sheet or layer which is held in place by that adhesive coating should be nominally waterproof as otherwise the birdlime would be able to extract too much moisture from its surroundings to be properly efficient in operation. As has already been described in this and my earlier patent specifications, the reason for employing the birdlime is to produce a fabric which shall be impervious to gas, more particularly hydrogen, helium and noxious gases.

In some cases it may be found desirable to add a preservative to the birdlime, and according to one feature of the invention a suitable quantity of perchloride of mercury may be used. This may conveniently be dissolved in water and added to the thinned birdlime. The amount of perchloride of mercury to be used may vary in wide limits according to circumstances. As an example .1 per cent by weight of the birdlime before thinning may be used.

It will be appreciated that this balloon-fabric need not always be used for balloons, for example, it may be employed for gas-masks as some of the noxious gases are capable of permeating materials which are not ordinarily permeated by air, but would be resisted by this fabric.

Instead of textile material other thin sheet material can be used, for example paper, and varnish or other waterproofing substances may be substituted for the external and internal rubber or rubber-like coating.

What I claim as my invention and desire to secure by Letters Patent is:—

1. A balloon or like fabric composed of two sheets of thin textile material placed face to face, whereof one sheet is of absorbent material and has on its inner face a "thin layer" of "birdlime" and the other sheet is so prepared that the "birdlime"

does not so readily adhere to it as to the first sheet, diatomaceous earth being incorporated in the birdlime.

2. A balloon or like fabric composed of two sheets of thin textile material placed face to face, whereof one sheet is of absorbent material and has on its inner face a "thin layer" of "birdlime" and the other sheet is so prepared that the "birdlime" does not so readily adhere to it as to the first sheet, diatomaceous earth and shellac being incorporated in the birdlime.

3. A balloon or like fabric composed of two sheets of thin textile material placed face to face, one of said sheets being of absorbent material and having on its inner face a "thin layer" of "birdlime" having diatomaceous earth incorporated therein, the other of said sheets being less absorbent than the first sheet, whereby the birdlime does not so readily adhere to it as to the first sheet.

4. A balloon or like fabric composed of two sheets of thin textile material placed face to face, whereof one sheet is of absorbent material and has on its inner face a "thin layer" of "birdlime" and the other sheet is so prepared that the "birdlime" does not so readily adhere to it as to the first sheet.

5. A balloon or like fabric composed of two sheets of thin textile material placed face to face, whereof one sheet is of absorbent material and has on its inner face a "thin layer" of "birdlime" and on its outer face a waterproof coating and the other sheet is so prepared that the "birdlime" does not so readily adhere to it as to the first sheet.

6. A balloon or like fabric composed of two sheets of thin textile material placed face to face, whereof one sheet is of absorbent material and has on its inner face a "thin layer" of "birdlime" and on its outer face a rubber coating and the other sheet is so prepared that the "birdlime" does not so readily adhere to it as to the first sheet.

7. A balloon or like fabric composed of two sheets of thin textile material placed face to face, whereof one sheet is of absorbent material and has on its inner face a "thin layer" of "birdlime" and the other sheet is so prepared that the "birdlime" does not so readily adhere to it as to the first sheet, said second sheet being provided on its inner face with a waterproof coating.

8. A balloon or like fabric composed of two sheets of thin textile material placed face to face, whereof one sheet is of absorbent material and has on its inner face a "thin layer" of "birdlime" and the other sheet is so prepared that the "birdlime" does not so readily adhere to it as to the first sheet, said second sheet being provided on its inner face with a rubber coating.

9. A balloon or like fabric composed of two sheets of thin textile material placed face to face, whereof one sheet is of absorbent material and has on its inner face a "thin layer" of "birdlime" and on its outer face a waterproof coating and the other sheet is so prepared that the "birdlime" does not so readily adhere to it as to the first sheet, said second sheet being provided on its inner face with a waterproof coating.

10. A method of manufacturing balloon or like fabric which consists in: (a) coating a sheet of material with a "thin layer" of "birdlime," (b) expelling moisture from the coating of "birdlime" by heating to a moderate heat, and (c) applying to the coating of "birdlime" thus dried an adhesive waterproof coating.

11. A method of manufacturing balloon or like fabric which consists in:—(a) coating a sheet of material with a layer of "birdlime" which has been thinned by heating to about 180° F. and mixing gradually therewith alcohol, (b) expelling moisture from the coating of "birdlime" by heating to a moderate heat, and (c) applying to the coating of "birdlime" thus dried an adhesive waterproof coating.

12. A method of manufacturing balloon or like fabric which consists in:—(a) coating a sheet of textile material with a layer of "birdlime" which has been thinned by heating to about 180° F. and mixing gradually therewith alcohol, (b) expelling moisture from the coating of "birdlime" by heating to a temperature not exceeding 180° F. and (c) applying to the coating of "birdlime" thus dried an adhesive waterproof coating.

13. A method of manufacturing ballon or like fabric which consists in:—(a) coating a sheet of material with a "thin layer" of "birdlime," (b) expelling moisture from the coating of "birdlime" by heating to a moderate heat, (c) applying to the coating of "birdlime" thus dried an adhesive waterproof coating, and (d) placing upon this adhesive coating a second sheet of material.

14. A method of manufacturing balloon or like fabric which consists in:—(a) coating a sheet of textile material with a "thin layer" of "birdline," (b) expelling moisture from the coating of "birdlime" by heating to a moderate heat, (c) applying to the coating of "birdlime" thus dried an adhesive waterproof coating, and (d) placing upon this adhesive coating a second sheet of textile material.

15. A balloon or like fabric composed of a sheet of thin material having upon it a "thin layer" of "birdlime" to which an adhesive waterproof coating has been applied after the "birdlime" has been dried by heating to a moderate heat.

16. A balloon or like fabric composed of a sheet of thin material having upon it a "thin layer" of "birdlime" to which an adhesive waterproof coating has been applied after the "birdlime" has been dried by heating to a temperature not exceeding 180° F.

17. A balloon or like fabric composed of two sheets of thin textile material placed face to face, whereof one sheet has on its face which lies towards the other sheet a "thin layer" of "birdlime" to which an adhesive waterproof coating has been applied after the "birdlime" has been dried by heating to a moderate heat.

18. A balloon or like fabric composed of two sheets of thin textile material placed face to face, whereof one sheet has on its face which lies towards the other sheet a "thin layer" of "birdlime" to which an adhesive waterproof coating has been applied after the "birdlime" has been dried by heating to a temperature not exceeding 180° F.

19. A balloon or like fabric composed of two sheets of thin textile material placed face to face, whereof one sheet is of absorbent material and has on its face which lies towards the other sheet a "thin layer" of "birdlime" to which an adhesive waterproof coating has been applied after the "birdlime" has been dried by heating to a moderate heat, and the other sheet is so prepared that the "birdlime" does not so readily adhere to it as to the first sheet.

20. A balloon or like fabric composed of thin sheet material coated with a "thin layer" of "birdlime" to which perchloride of mercury has been added.

21. A balloon or like fabric composed of thin sheet material coated with a "thin layer" of "birdlime" to which has been added perchloride of mercury in the proportion of .1% by weight of the "birdlime" before thinning.

22. A balloon or like fabric composed of a thin sheet of material coated with a layer of a composition comprising "birdlime" which has been thinned by heating to about 180° F. and to which has been added alcohol and aqueous solution of perchloride of mercury.

23. A balloon or like fabric composed of a thin sheet of material coated with a layer of a composition comprising "birdlime" which has been thinned by heating to about 180° F. and to which has been added alcohol and aqueous solution of perchloride of mercury in the proportion of .1% by weight of the birdlime before thinning.

24. A balloon or like fabric composed of thin sheet material coated with a "thin layer" of "birdlime" to which perchloride of mercury and diatomaceous earth has been added.

25. A balloon or like fabric composed of thin sheet material coated with a "thin layer" of "birdlime" to which perchloride of mercury, diatomaceous earth, and shellac has been added.

26. A method of manufacturing balloon or like fabric which consists in:—(a) coating a sheet of material with a "thin layer" of "birdlime" containing diatomaceous earth, (b) expelling moisture from the coating of "birdlime" by heating to a moderate heat, and (c) applying to the coating of "birdlime" thus dried an adhesive waterproof coating.

27. A method of manufacturing balloon or like fabric which consists in:—(a) coating a sheet of material with a "thin layer" of "birdlime" containing diatomaceous earth and shellac, (b) expelling moisture from the coating of "birdlime" by heating to a moderate heat, and (c) applying to the coating of "birdlime" thus dried an adhesive waterproof coating.

In testimony whereof I affix my signature.

CHARLES ANGUS CLEGHORN.